(12) United States Patent
Xiao et al.

(10) Patent No.: US 11,462,723 B2
(45) Date of Patent: Oct. 4, 2022

(54) ELECTROCHEMICAL CELLS WITH COPPER-FREE ELECTRODES AND METHODS FOR MANUFACTURING THE SAME

(71) Applicant: GM GLOBAL TECHNOLOGY OPERATIONS LLC, Detroit, MI (US)

(72) Inventors: Xingcheng Xiao, Troy, MI (US); Hongliang Wang, Sterling Heights, MI (US); Meinan He, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/082,618

(22) Filed: Oct. 28, 2020

(65) Prior Publication Data

US 2022/0131126 A1 Apr. 28, 2022

(51) Int. Cl.
| | |
|---|---|
| *H01M 4/04* | (2006.01) |
| *H01M 4/46* | (2006.01) |
| *B05D 1/02* | (2006.01) |
| *B05D 1/32* | (2006.01) |

(52) U.S. Cl.
CPC ....... *H01M 4/0435* (2013.01); *H01M 4/0419* (2013.01); *H01M 4/463* (2013.01); *B05D 1/02* (2013.01); *B05D 1/32* (2013.01); *H01M 4/0442* (2013.01)

(58) Field of Classification Search
USPC .................................. 429/209; 427/115, 282
See application file for complete search history.

(56) References Cited

U.S. PATENT DOCUMENTS

| | | | | |
|---|---|---|---|---|
| 3,202,588 | A * | 8/1965 | Fromson | C25D 11/04 428/653 |
| 3,391,065 | A * | 7/1968 | Gerhard | C25D 11/005 204/224 R |
| 3,587,524 | A * | 6/1971 | Keating | C23C 14/042 118/500 |
| 6,275,004 | B1 | 8/2001 | Tamai et al. | |
| 6,506,678 | B1 * | 1/2003 | Sukharev | H01L 21/76888 257/E21.291 |
| 8,565,949 | B2 | 10/2013 | Christman et al. | |

(Continued)

*Primary Examiner* — Brian K Talbot
(74) *Attorney, Agent, or Firm* — Quinn IP Law (57) ABSTRACT

Presented are electrochemical devices with copper-free electrodes, methods for making/using such devices, and lithium alloy-based electrode tabs and current collectors for rechargeable lithium-class battery cells. A method of manufacturing copper-free electrodes includes feeding an aluminum workpiece, such as a strip of aluminum sheet metal, into a masking device. The masking device then applies a series of dielectric masks, such as strips of epoxy resin or dielectric tape, onto discrete areas of the workpiece to form a masked aluminum workpiece with masked areas interleaved with unmasked areas. The masked workpiece is then fed into an electrolytic anodizing solution, such as sulfuric acid, to form an anodized aluminum workpiece with anodized surface sections on the unmasked areas interleaved with un-anodized surface sections underneath the dielectric masks of the masked areas. The dielectric masks are removed to reveal the un-anodized surface sections, and the anodized aluminum workpiece is segmented into multiple copper-free electrodes.

13 Claims, 4 Drawing Sheets

(56) References Cited

U.S. PATENT DOCUMENTS

| | | |
|---|---|---|
| 9,142,980 B2 | 9/2015 | Lee |
| 9,660,462 B2 | 5/2017 | Jeon |
| 9,923,189 B2 | 3/2018 | Xiao |
| 10,062,898 B2 | 8/2018 | Xiao |
| 10,199,643 B2 | 2/2019 | Zhou et al. |
| 10,367,201 B2 | 7/2019 | Yang et al. |
| 10,388,959 B2 | 8/2019 | Dong et al. |
| 10,424,784 B2 | 9/2019 | Yang et al. |
| 10,446,884 B2 | 10/2019 | Yang et al. |
| 10,511,049 B2 | 12/2019 | Yang et al. |
| 10,566,652 B2 | 2/2020 | Dai et al. |
| 10,573,879 B2 | 2/2020 | Yang et al. |
| 10,629,941 B2 | 4/2020 | Dai et al. |
| 10,637,048 B2 | 4/2020 | Qi et al. |
| 10,673,046 B2 | 6/2020 | Dadheech et al. |
| 10,826,076 B1 * | 11/2020 | Macauley ............. H01M 4/926 |
| 2003/0057518 A1 * | 3/2003 | Schaper ............... H01L 27/016 |
| | | 257/E27.048 |
| 2011/0215767 A1 | 9/2011 | Johnson et al. |
| 2011/0248675 A1 | 10/2011 | Shiu et al. |
| 2012/0132529 A1 * | 5/2012 | Zekry .................. C25D 11/022 |
| | | 205/118 |
| 2012/0206296 A1 | 8/2012 | Wan |
| 2013/0119935 A1 | 5/2013 | Sufrin-Disler et al. |
| 2014/0152232 A1 | 6/2014 | Johnson et al. |
| 2014/0255791 A1 * | 9/2014 | Miao .................... H01M 4/139 |
| | | 429/212 |
| 2015/0280027 A1 * | 10/2015 | Moors ............ H01L 31/022441 |
| | | 438/85 |
| 2019/0280333 A1 | 9/2019 | Dahn et al. |
| 2019/0280334 A1 | 9/2019 | Dahn et al. |
| 2019/0393546 A1 | 12/2019 | Dahn et al. |
| 2020/0280071 A1 * | 9/2020 | Yoshii ................. H01M 10/052 |

* cited by examiner

ELECTROCHEMICAL CELLS WITH COPPER-FREE ELECTRODES AND METHODS FOR MANUFACTURING THE SAME

INTRODUCTION

The present disclosure relates generally to electrochemical devices. More specifically, aspects of this disclosure relate to copper-free, anodized electrode tabs and current collectors for rechargeable lithium-class battery cells of electric-drive vehicles.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid electric and full electric (collectively "electric-drive") vehicles, on the other hand, utilize alternative power sources to propel the vehicle and, thus, minimize or eliminate reliance on a fossil-fuel based engine for tractive power.

A full electric vehicle (FEV)—colloquially labeled an "electric car"—is a type of electric-drive vehicle configuration that altogether omits the internal combustion engine and attendant peripheral components from the powertrain system, relying on a rechargeable energy storage system (RESS) and a traction motor for vehicle propulsion. The engine assembly, fuel supply system, and exhaust system of an ICE-based vehicle are replaced with a single or multiple traction motors, a traction battery pack, and battery cooling and charging hardware in a battery-based FEV. Hybrid electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

Many commercially available hybrid electric and full electric vehicles employ a rechargeable traction battery pack to store and supply the requisite power for operating the powertrain's traction motor unit(s). In order to generate tractive power with sufficient vehicle range and speed, a traction battery pack is significantly larger, more powerful, and higher in capacity (Amp-hr) than a standard 12-volt starting, lighting, and ignition (SLI) battery. Compared to the single cell of an SLI battery, contemporary traction battery packs group stacks of battery cells into individual battery modules that are mounted onto the vehicle chassis, e.g., by a battery pack housing or support tray. Stacked electrochemical battery cells may be connected in series or parallel through use of an electrical interconnect board (ICB). The electrical tabs of the individual battery cells, which project out from the module housing, may be bent against and welded to shared busbar plates. A dedicated Battery Pack Control Module (BPCM), through collaborative operation with a Powertrain Control Module (PCM), regulates the opening and closing of battery pack contactors to regulate operation of the battery pack for powering the vehicle's traction motor(s).

There are four primary types of batteries that are used in electric-drive vehicles: lithium-class batteries, nickel-metal hydride batteries, ultracapacitor batteries, and lead-acid batteries. As per lithium-class designs, lithium-metal (primary) batteries and lithium-ion (secondary) batteries make up the bulk of commercial lithium battery (LiB) configurations with Li-ion batteries being employed in automotive applications due to their enhanced stability, energy density, and rechargeable capabilities. A conventional lithium-ion cell is composed to two conductive electrodes, an electrolyte material, and a permeable separator, all of which are enclosed inside an electrically insulated packaging. One electrode serves as a positive electrode ("cathode") and the other electrode serves as a negative electrode ("anode"). Rechargeable Li-ion batteries operate by reversibly passing lithium ions back and forth between the negative and positive electrodes. The separator, which generally consists of a microporous polymeric membrane, is disposed between the two electrodes to prevent electrical short circuits while also allowing the transport of ionic charge carriers. The electrolyte is suitable for conducting lithium ions and may be in solid form (e.g., solid state diffusion) or liquid form (e.g., liquid phase diffusion). Lithium-ions move from the negative electrode to the positive electrode during discharge of the battery while under load, and in the opposite direction when charging the battery.

SUMMARY

Presented herein are electrochemical devices with copper-free electrodes, methods for making and methods for using such devices, and lithium alloy-based electrode tabs and current collectors for rechargeable lithium-class battery cells. By way of example, and not limitation, there are presented Li-ion soft polymer (LiPo) pouch cells with copper-free, anodized lithium-aluminum (LiAl) alloy electrodes, manufacturing processes for selectively anodizing LiAl electrode tabs, and techniques for internal/external welding of anodized LiAl electrode tabs during assembly of LiPo pouch cells. For instance, a selective anodizing process is employed to apply an anodized aluminum oxide (AAO) surface coating to discrete areas of an LiAl-alloy anode. Prior to anodization, a mask of dielectric tape or epoxy resin is rolled or sprayed—in a metered fashion at predefined intervals—onto the surface of aluminum sheet metal. The masked aluminum sheet is then transferred into a chemical bath, e.g., of an electrolytic anodizing solution of sulfuric acid, to engender anodization of the exposed sheet metal surfaces. Once anodized, the mask material is dissolved, peeled, or otherwise removed from the aluminum surface to expose the un-anodized surface areas. A transverse sealing strip is then applied at select intervals along the length of the sheet metal; the sheet metal strip is thereafter cut into individual tabs. Each tab is inserted into a cell pouch and joined to a respective copper-free current collector; the pouch is then sealed using the sealing strips. The un-anodized areas of neighboring LiAl electrode tabs are electrically interconnected, e.g., via laser welding.

Attendant benefits for at least some of the disclosed concepts include copper-free electrode tabs and current collectors that reduce cell weight and increase cell energy density relative to counterpart copper-based electrochemical cells. In addition, use of porous anodized aluminum oxide surface coatings for the cell tabs helps to improve mechanical protection of the tabs and facilitates electrolyte charge transfer. Selective anodization of distinct areas of an LiAl alloy cell tab helps to improve weld quality and concomitantly decrease weld brittleness and electrical resistivity. Additional cost savings and cell weight reductions may be realized through the use of disclosed copper-free cell tabs that enable reduced tab lengths and direct cell-to-cell connectivity and, thus, eliminate inter-cell busbars. Other attendant benefits include the ability to easily scale-up LiPo battery cell fabrication and reduce associated manufacturing costs.

Aspects of this disclosure are directed to fabrication techniques, control logic, and computer-readable media (CRM) for making and/or using lithium alloy-based electrode tabs and current collectors for rechargeable lithium-class battery cells. In an example, a method is presented for manufacturing copper-free electrodes for electrochemical devices. This representative method includes, in any order and in any combination with any of the above and below disclosed options and features: feeding a copper-free metal workpiece into a masking device; applying a series of dielectric masks onto discrete areas of the metal workpiece via the masking device to form a masked metal workpiece with masked surface areas interleaved with unmasked surface areas; feeding the masked workpiece into an anodizing solution to form an anodized metal workpiece with anodized surface sections on the unmasked surface areas and interleaved with un-anodized surface sections underneath the dielectric masks of the masked surface areas; removing the dielectric masks to reveal the un-anodized surface sections; and segmenting the anodized metal workpiece into multiple copper-free electrodes.

Additional aspects of this disclosure are directed to lithium-class battery cells with lithium alloy-based electrode tabs and current collectors, rechargeable battery packs employing such lithium-class battery cells, and electric-drive vehicles equipped with such battery packs. As used herein, the terms "vehicle" and "motor vehicle" may be used interchangeably and synonymously to include any relevant vehicle platform, such as passenger vehicles (HEV, FEV, fuel cell, fully and partially autonomous, etc.), commercial vehicles, industrial vehicles, tracked vehicles, off-road and all-terrain vehicles (ATV), motorcycles, farm equipment, watercraft, aircraft, e-bikes, e-scooters, etc. For non-automotive applications, disclosed concepts may be implemented for any logically relevant use, including stand-alone power stations and portable power packs, photovoltaic systems, handheld electronic devices, pumping equipment, machine tools, appliances, etc.

Aspects of this disclosure are also directed to battery cell production facilities and assembly lines for fabricating lithium-class battery cells with lithium alloy-based electrode tabs and current collectors. For instance, a manufacturing system is presented for producing copper-free electrodes for electrochemical devices. This manufacturing system includes a supply station that stores and supplies copper-free metal workpieces, and a masking device that is located downstream from the supply station. The masking device is operable to apply a series of transversely oriented, longitudinally spaced dielectric masks onto discrete areas of the workpiece to form a masked metal workpiece with masked areas interleaved with unmasked areas. An anodizing bath, which is located downstream from the masking station, stores an anodizing solution that anodizes the unmasked surface areas of the workpiece. Doing so forms an anodized metal workpiece with anodized surface sections that are located on the unmasked areas of the workpiece and interleaved with un-anodized surface sections, which are located underneath the dielectric masks of the masked areas. A mask removal station, which is located downstream from the anodizing bath, removes the dielectric masks from the anodized workpiece to reveal the un-anodized surface sections. A cutting station selectively segments the anodized metal workpiece into multiple copper-free electrodes.

For any of the disclosed systems, methods, and applications, the masking device may include one or more supply spools that each supports a roll of dielectric tape. In this instance, each of the dielectric masks on the metal workpiece is a respective strip of tape cut from the roll of dielectric tape. The masking device may also include one or more pinch-type tape feed rollers. In this instance, each tape feed roller draws a feed of dielectric tape from one of the rolls of dielectric tape on a supply spool, and presses the fed dielectric tape onto the discrete areas of the workpiece. In order to remove the dielectric masks, the mask removal station may include a solution storage container for stowing an organic solution that dissolves strips of dielectric tape from the anodized workpieces. Alternatively, the mask removal station may include a peeling station that is operable to peel strips of dielectric tape off of the surfaces of workpieces.

For any of the disclosed systems, methods, and applications, the masking device may include an epoxy supply container, a spray nozzle coupled to the epoxy supply container, and one or more pairs of opposing feed rollers. In this instance, the supply container stores an epoxy resin; the spray nozzle sprays metered amounts of the epoxy resin such that each dielectric mask is composed of a respective strip of cured epoxy resin. The pair or pairs of feed rollers are operable to draw the workpiece into and, once masked, through the masking device. In order to remove the dielectric masks, the mask removal station may include a solution storage container that stores and, optionally, dispenses an organic solution for dissolving strips of epoxy resin from anodized metal workpieces.

For any of the disclosed systems, methods, and applications, each copper-free electrodes—be it an electrode tab, a current collector, or a combination of the two—is formed, in whole or in part, from a lithium-aluminum alloy material. As yet a further option, the anodizing solution may cause a porous layer of anodized aluminum oxide to form on the unmasked surface areas of the aluminum workpiece; an optional layer of nickel-rich manganese oxide, such as NMC811, may be applied onto the surface of the porous AAO. During the masking process, one series of dielectric masks may be applied onto one set of distinct areas of a top (first) side of each metal workpiece, and another series of dielectric masks may be applied onto another set of distinct areas of a bottom (second) side of each workpiece.

For any of the disclosed systems, methods, and applications, a series of transversely oriented, longitudinally spaced sealing strips may be applied onto the anodized metal workpiece adjacent each un-anodized surface section. These sealing strips fluidly seal to a housing section of the electrochemical device (e.g., onto an interior lip of a cell pouch wall). As yet a further option, a welding station may be employed to weld each of the un-anodized surface sections of each copper-free electrode to a respective copper-free current collector and/or a respective neighboring electrode. Moreover, an metal workpiece may be composed of a strip of aluminum sheet metal drawn from a roll of sheet metal that is mounted onto a workpiece feed roller. In this instance, the aluminum workpiece is fed into the masking station by drawing the aluminum sheet metal strip from the roll of sheet metal off of the workpiece feed roller. One or more or all of the above manufacturing steps may be fully or partially automated. Furthermore, additional and alternative manufacturing steps and/or manufacturing stations may be employed as part of the production and assembly of disclosed copper-free electrodes.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features presented above and below.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for instance, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Introduction, Summary, Description of the Drawings, and Detailed Description sections, but not explicitly set forth in the claims, should not be incorporated into the claims, singly or collectively, by implication, inference, or otherwise. Moreover, the drawings discussed herein may not be to scale and are provided purely for instructional purposes. Thus, the specific and relative dimensions shown in the Figures are not to be construed as limiting.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and permutations thereof, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Figure 1:
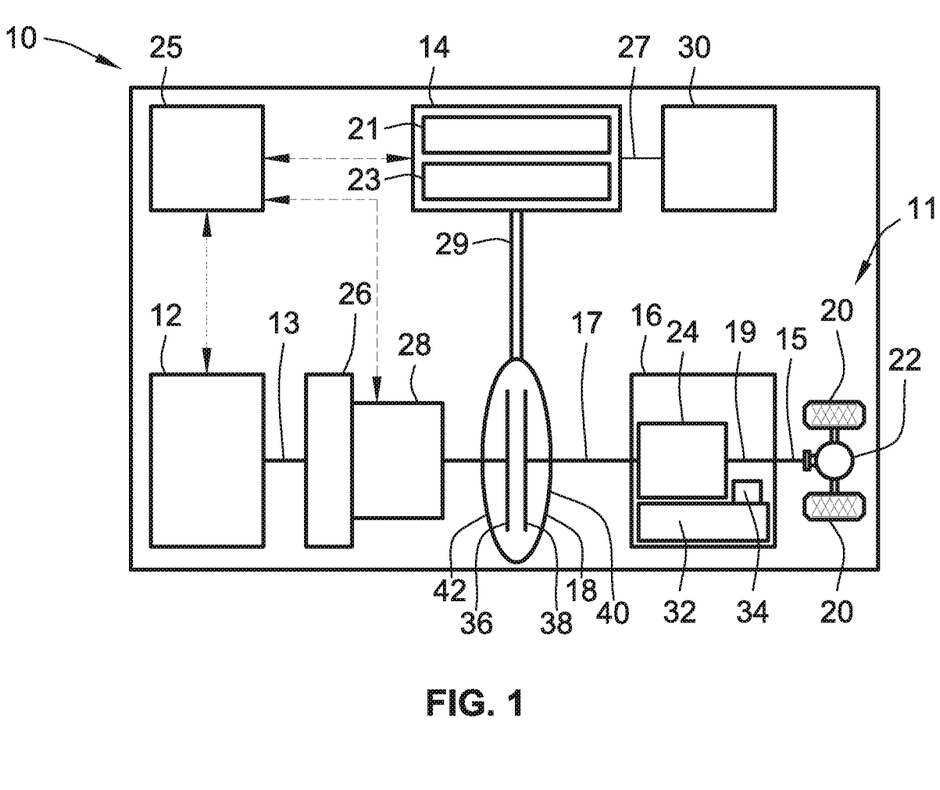
FIG. 1 is a schematic illustration of a representative electric-drive vehicle with a hybrid electric powertrain employing an electric motor/generator unit (MGU) powered by a rechargeable traction battery pack with copper-free battery cells in accord with aspects of the present disclosure.

Referring now to the drawings, wherein like reference numbers refer to like features throughout the several views, there is shown in FIG. 1 a schematic illustration of a representative automobile, which is designated generally at 10 and portrayed herein for purposes of discussion as a passenger vehicle with a parallel two-clutch (P2) hybrid-electric powertrain. The illustrated automobile 10—also referred to herein as "motor vehicle" or "vehicle" for short—is merely an exemplary application with which novel aspects of this disclosure may be practiced. In the same vein, implementation of the present concepts into a hybrid electric powertrain should also be appreciated as a representative implementation of the novel concepts disclosed herein. As such, it will be understood that facets of the present disclosure may be applied to other powertrain architectures, incorporated into any logically relevant type of motor vehicle, and utilized for both automotive and non-automotive applications alike. Lastly, only select components have been shown and will be described in additional detail herein. Nevertheless, the vehicles (FIG. 1), electrochemical devices (FIG. 2), and manufacturing systems (FIGS. 3A and 3B) discussed below may include numerous additional and alternative features, and other available peripheral components and hardware, for carrying out the various methods and functions of this disclosure.

The representative vehicle powertrain system is shown in FIG. 1 with a prime mover—represented herein by a restartable internal combustion engine (ICE) assembly 12 and an electric motor/generator unit 14—that drivingly connects to a driveshaft 15 of a final drive system 11 by a multi-speed automatic power transmission 16. The engine 12 transfers power, preferably by way of torque via an engine crankshaft 13 ("engine output member"), to an input side of the transmission 16. Engine torque is first transmitted via the crankshaft 13 to rotate an engine-driven torsional damper assembly 26, and concomitantly transferred through the torsional damper assembly 26 to an engine disconnect device 28. This engine disconnect device 28, when operatively engaged, transmits torque received from the ICE assembly 12, by way of the damper 26, to input structure of the TC assembly 18. As the name implies, the engine disconnect device 28 may be selectively disengaged to drivingly disconnect the engine 12 from the motor 14, TC assembly 18, and transmission 16.

The transmission 16, in turn, is adapted to receive, selectively manipulate, and distribute tractive power from the engine 12 and motor 14 to the vehicle's final drive system 11—represented herein by a driveshaft 15, rear differential 22, and a pair of rear road wheels 20—and thereby propel the hybrid vehicle 10. The power transmission 16 and torque converter 18 of FIG. 1 may share a common transmission oil pan or "sump" 32 for supply of hydraulic fluid. A shared transmission pump 34 provides sufficient hydraulic pressure for the fluid to selectively actuate hydraulically activated elements of the transmission 16, the TC assembly 18 and, for some implementations, the engine disconnect device 28.

The ICE assembly 12 operates to propel the vehicle 10 independently of the electric traction motor 14, e.g., in an "engine-only" operating mode, or in cooperation with the motor 14, e.g., in "vehicle-launch" or "motor-boost" operating modes. In the example depicted in FIG. 1, the ICE assembly 12 may be any available or hereafter developed engine, such as a compression-ignited diesel engine or a spark-ignited gasoline or flex-fuel engine, which is readily adapted to provide its available power output typically at a number of revolutions per minute (RPM). Although not explicitly portrayed in FIG. 1, it should be appreciated that the final drive system 11 may take on any available configuration, including front wheel drive (FWD) layouts, rear wheel drive (RWD) layouts, four-wheel drive (4WD) layouts, all-wheel drive (AWD) layouts, six-by-four (6×4) layouts, etc.

FIG. 1 also depicts an electric motor/generator unit ("motor") 14 that operatively connects via a motor support hub, shaft, or belt 29 ("motor output member") to the hydrodynamic torque converter 18. The torque converter 18, in turn, drivingly connects the motor 14 to an input shaft 17 ("transmission input member") of the transmission 16. The electric motor/generator unit 14 is composed of an annular stator assembly 21 circumscribing and concentric with a cylindrical rotor assembly 23. Electric power is provided to the stator 21 through a high-voltage electrical system, including electrical conductors/cables 27 that pass through the motor housing via suitable sealing and insulating feedthroughs (not illustrated). Conversely, electric power may be provided from the MGU 14 to an onboard traction battery pack 30, e.g., through regenerative braking. Operation of any of the illustrated powertrain components may be governed by an onboard or remote vehicle controller, such as programmable electronic control unit (ECU) 25. While shown as a P2 hybrid-electric architecture, the vehicle 10 may employ other HEV powertrain configurations, including P0, P1, P2.5, P3 and P4 configurations, or may be adapted for an BEV, PHEV, fuel-cell hybrid vehicle, FEVs, etc.

Power transmission 16 may use differential gearing 24 to achieve selectively variable torque and speed ratios between transmission input and output shafts 17 and 19, respectively, e.g., while sending all or a fraction of its power through the variable elements. One form of differential gearing is the epicyclic planetary gear arrangement. Planetary gearing offers the advantage of compactness and different torque and speed ratios among all members of the planetary gearing subset. Traditionally, hydraulically actuated torque establishing devices, such as clutches and brakes (the term "clutch" used to reference both clutches and brakes), are selectively engageable to activate the aforementioned gear elements for establishing desired forward and reverse speed ratios between the transmission's input and output shafts 17, 19. While envisioned as an 8-speed automatic transmission, the power transmission 16 may optionally take on other functionally appropriate configurations, including Continuously Variable Transmission (CVT) architectures, automated-manual transmissions, etc.

Hydrokinetic torque converter assembly 18 of FIG. 1 operates as a fluid coupling for operatively connecting the engine 12 and motor 14 with the internal epicyclic gearing 24 of the power transmission 16. Disposed within an internal fluid chamber of the torque converter assembly 18 is a bladed impeller 36 juxtaposed with a bladed turbine 38. The impeller 36 is situated in serial power-flow fluid communication in juxtaposition with the turbine 38, with a stator (not shown) interposed between the impeller 36 and turbine 38 to selectively alter fluid flow therebetween. The transfer of torque from the engine and motor output members 13, 29 to the transmission 16 via the TC assembly 18 is through stirring excitation of hydraulic fluid, such as transmission oil, inside the TC's internal fluid chamber caused by rotation of the impeller and turbine 36, 38 blades. To protect these components, the torque converter assembly 18 is constructed with a TC pump housing, defined principally by a transmission-side pump shell 40 fixedly attached to an engine-side pump cover 42 such that a working hydraulic fluid chamber is formed therebetween.

Figure 2:
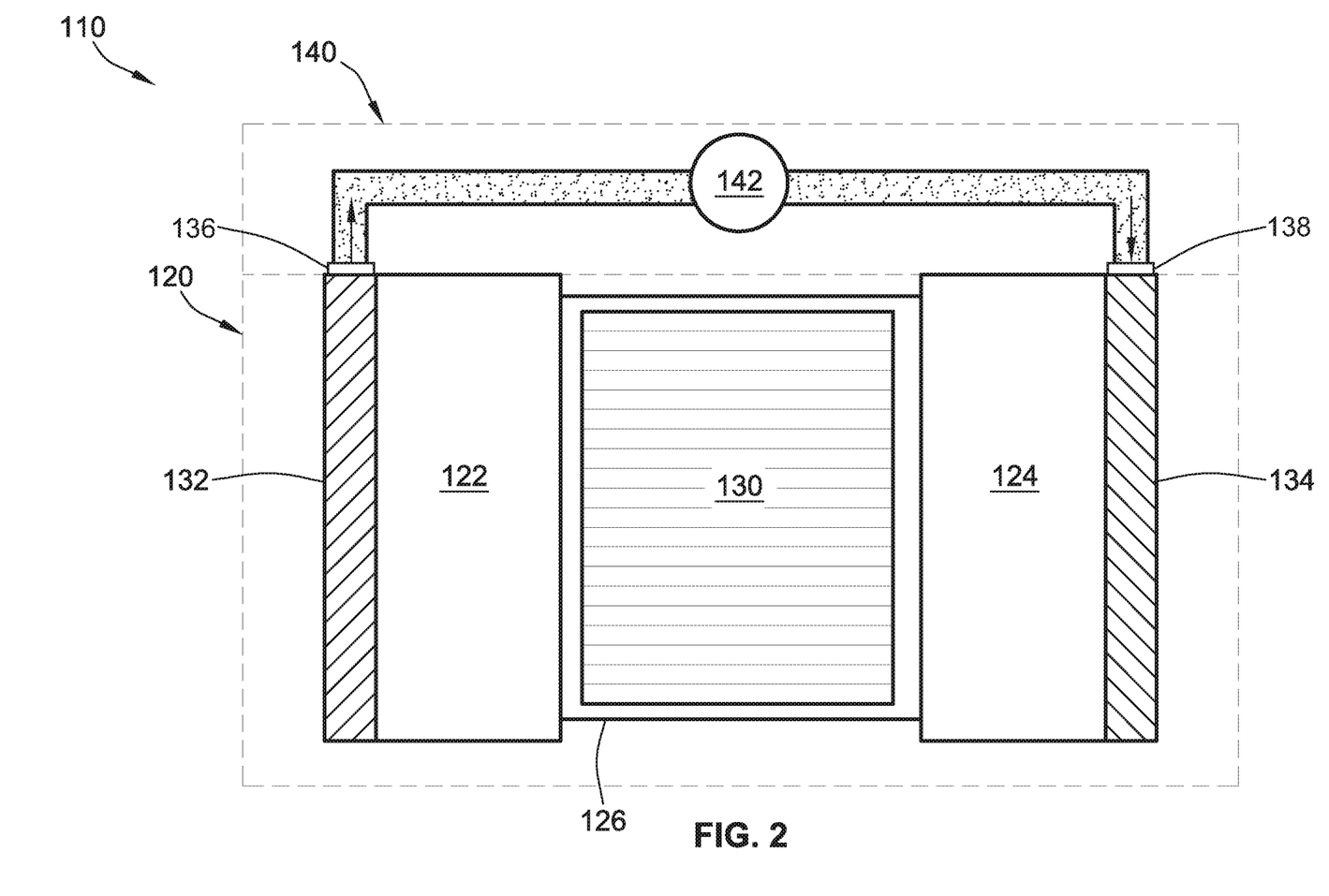
FIG. 2 is a schematic illustration of a representative lithium-class electrochemical device including a copper-free anode electrode and a copper-free cathode electrode in accordance with aspects of the present disclosure.

Presented in FIG. 2 is an exemplary electrochemical device in the form of a rechargeable (secondary) lithium-ion battery 110 that facilitates direct current fast charging (DCFC) for a desired electrical load, such as automobile 10 of FIG. 1. Battery 110 includes a pair of electrically conductive electrodes, namely a first (negative or anode) working electrode 122 and a second (positive or cathode) working electrode 124, packaged inside a protective outer housing 120. In at least some configurations, the battery housing 120 may be an envelope-like pouch that is formed of aluminum foil or other suitable sheet material, both sides of which may be coated with a polymeric finish that insulates the metal from the internal cell elements and from adjacent cells, if any. Reference to either working electrode 122, 124 as an "anode" or "cathode" or, for that matter, as "positive" or "negative" is not intended to limit the electrodes 122, 124 to a particular polarity as the system polarity may change depending on how the battery 110 is being operated (i.e., charged or discharged). Although FIG. 2 illustrates the components of a single battery cell unit inserted within the battery housing 120, it should be appreciated that the housing 110 may stow therein a sandwiched stack of multiple cell component units (e.g., five to fifteen units).

With continuing reference to FIG. 2, anode electrode 122 may be fabricated from a material that is capable of incorporating lithium ions during a battery charging operation, and releasing lithium ions during a battery discharging operation. Exemplary anode materials suitable for this function may include, but are not limited to, carbon materials (e.g., graphite, coke, soft carbons, and hard carbons) and metals (e.g., Si, Al, Sn, and/or alloys thereof). In this regard, the cathode electrode 124 may be fabricated from a material that is capable of supplying lithium ions during a battery charging operation, and incorporating lithium ions during a battery discharging operation. The cathode 240 material may include, for instance, lithium alloy-based materials, such as lithium metal oxide, phosphate, or silicate, such as LiAl-alloys, $LiMO_2$ (M=Co, Ni, Mn, or combinations thereof); $LiM_2O_4$ (M=Mn, Ti, or combinations thereof); $LiMPO_4$ (M=Fe, Mn, Co, or combinations thereof); and $LiM_xM'_{2-x}O_4$ (M, M'=Mn or Ni). It may be desirable that the anode electrode 122 and cathode electrode 124 be fabricated from materials that exhibit a long cycle life and calendar life, and do not experience significant resistance increase throughout the life of the battery.

Disposed inside the battery housing 120 between the two electrodes 122, 124 is a porous separator 126, which may be in the nature of a microporous or nanoporous polymeric separator. The porous separator 126 includes a non-aqueous fluid electrolyte composition 130, which may also be present in the negative electrode 122 and the positive electrode 124. A negative electrode current collector 132 may be positioned at or near the negative electrode 122, and a positive electrode current collector 134 may be positioned at or near the positive electrode 124. The negative electrode current collector 132 and positive electrode current collector 134 respectively collect and move free electrons to and from an external circuit 140. An interruptible external circuit 140 and load 142 connects to the negative electrode 122, through its respective current collector 132 and electrode tab 136, and to the positive electrode 124, through its respective current collector 134 and electrode tab 138. Separator 126 may be a sheet-like structure that is composed of a porous polyolefin membrane, e.g., with a porosity of about 35% to 65% and a thickness of approximately 25-30 microns. These separators 126 may be modified, for instance, by the addition of electrically non-conductive ceramic particles (e.g., silica) that are coated on the porous membrane surfaces.

The porous separator 126 may operate as both an electrical insulator and a mechanical support structure by being sandwiched between the two electrodes 122, 124 to prevent the electrodes from physical contacting each other and thus, the occurrence of a short circuit. In addition to providing a physical barrier between the electrodes 122, 124, the porous separator 126 may provide a minimal resistance path for internal passage of lithium ions (and related anions) during cycling of the lithium ions to facilitate functioning of the battery 120. In lithium-ion batteries, the lithium intercalates and/or alloys in the electrode active materials; conversely, in a lithium sulfur battery, instead of intercalating or alloying, the lithium dissolves from the negative electrode and migrates to the positive electrode where it reacts/plates during battery discharge. For some optional configurations, the porous separator 126 may be a microporous polymeric separator including a polyolefin. The polyolefin may be a homopolymer, which is derived from a single monomer constituent, or a heteropolymer, which is derived from more than one monomer constituent, and may be either linear or branched.

Operating as a rechargeable electric storage system, battery 120 generates electric current that is transmitted to one or more loads 142 operatively connected to the external circuit 140. While the load 142 may be any number of electrically powered devices, a few non-limiting examples of power-consuming load devices include an electric motor for a hybrid electric vehicle or an all-electric vehicle, a laptop computer or tablet computer, a cellular phone, and cordless power tools or appliances. The battery 120 may include a variety of other components that, while not depicted herein for simplicity and brevity, are nonetheless commercially available and readily available. For instance, the battery 120 may include one or more gaskets, terminal caps, tabs, battery terminals, and any other conventional components or materials that may be situated within the battery 120, by way of non-limiting example. Moreover, the size and shape and operating characteristics of the battery 120 may vary depending on the particular application for which it is designed.

Lithium-ion battery 110 may take on a "copper-free" design in which both of the battery electrodes 122, 124, including their respective current collectors 132, 134 and electrode tabs 136, 138, are substantially or entirely absent of copper and copper compounds. This elimination of or marked reduction in copper from the battery 110 helps to simplify the electrode fabrication process and cell assembly process, in turn helping to lower cell manufacturing costs. Other attendant advantages may include the elimination of mixed-material welds, such as the joining of copper-based electrode tabs to aluminum-based electrode tabs, which leads to significant improvements in weld joint quality with concomitant increases in cell energy density and reduced electrical resistivity. Replacing the electrochemical device's copper cathode/anode with a less expensive and lighter weight material, such as an aluminum or aluminum-alloy material, realizes reductions in cell weight and cell material costs. Additionally, coating lithium-aluminum (LiAl) electrodes with a porous anodized aluminum oxide (AAO) layer helps to improve mechanical protection of the electrodes and also helps to facilitate charge transfer.

Figure 3A:
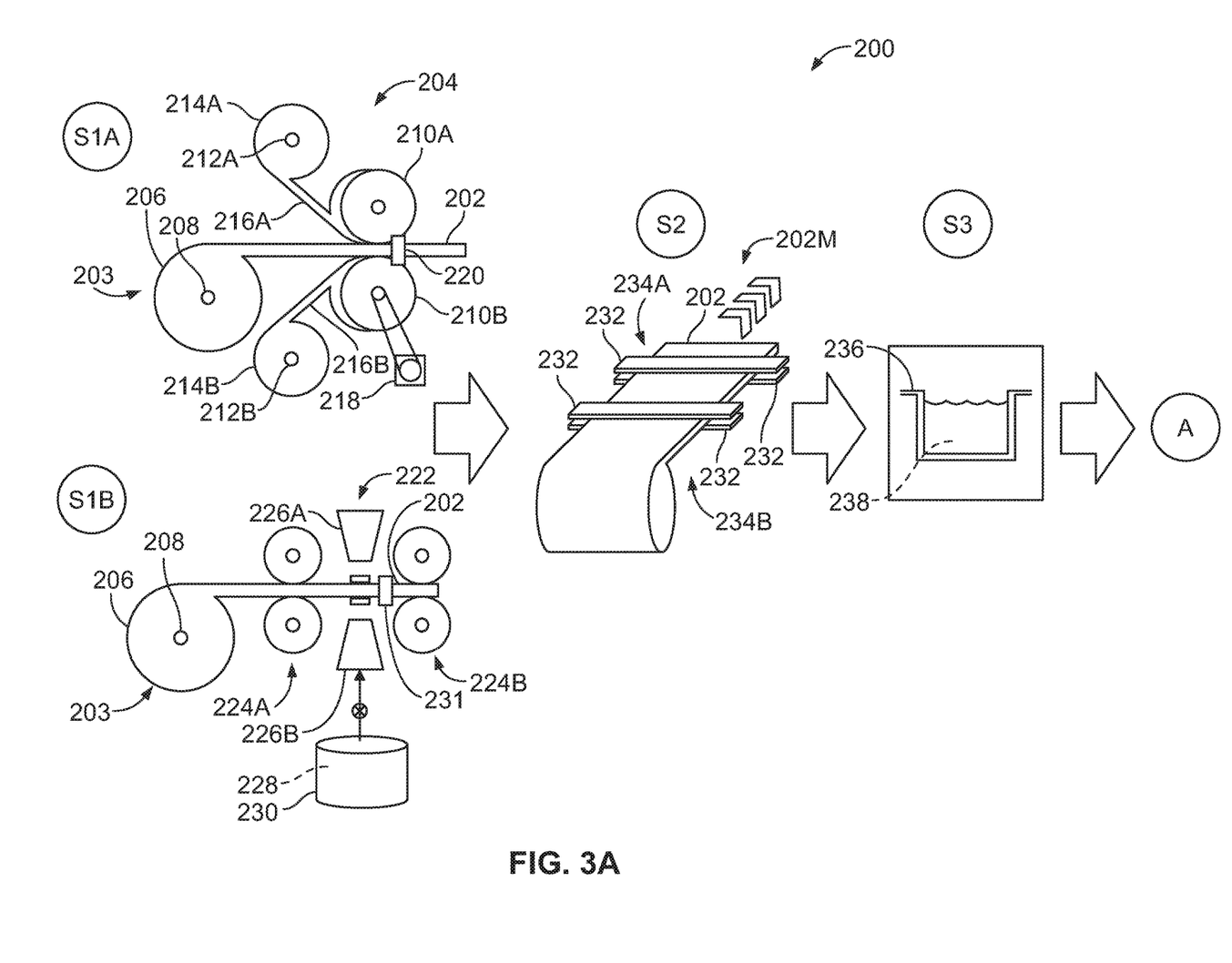
FIGS. 3A and 3B illustrate a workflow diagram for a representative system and method for manufacturing a selectively anodized, copper-free electrode of an electrochemical device, in which some or all of the manufacturing operations may correspond to memory-stored instructions that are executable by a resident or remote controller, control-logic circuit, programmable control unit, or other integrated circuit (IC) device or network of devices in accord with aspects of the disclosed concepts.
Figure 3B:
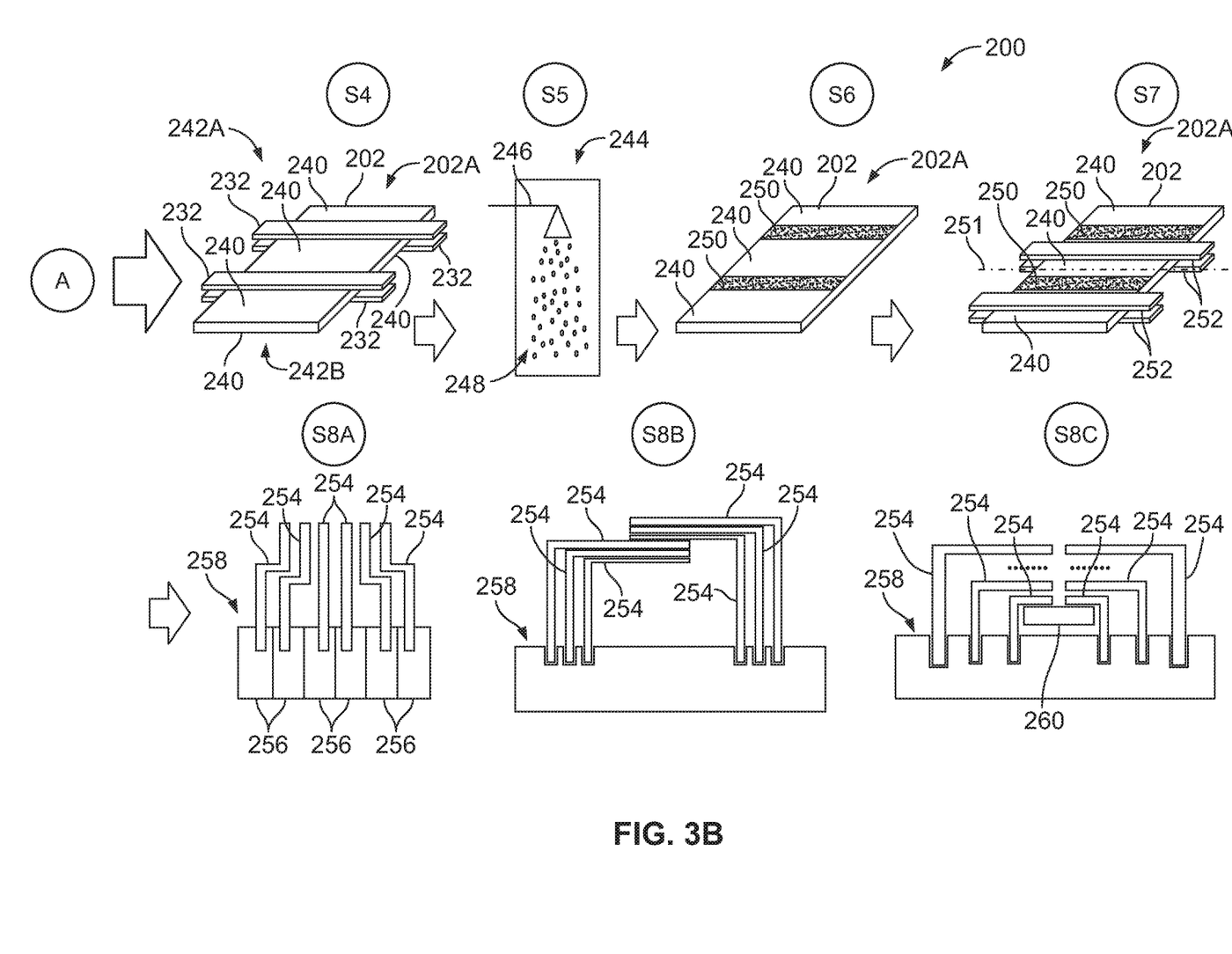

With reference next to FIGS. 3A and 3B, there is shown an example of a manufacturing system and attendant manufacturing process (collectively designated as 200) for producing a selectively anodized, copper-free electrode of an electrochemical device, such as the battery 110 of FIG. 2, for powering a load, such as the HEV powertrain of vehicle 10 of FIG. 1. Some or all of the operations illustrated in FIGS. 3A and 3B, and described in further detail below, may be automated through execution of processor-executable instructions, for example, by manufacturing system control hardware. These instructions may be stored, for example, in main or auxiliary or remote memory, and executed, for example, by an electronic controller, processing unit, control logic circuit, or other module or device or network of modules/devices, to perform any or all of the above and below described functions associated with the disclosed concepts. It should be recognized that the order of execution of the illustrated operations may be modified, additional operations may be added, and some of the described operations may be modified, combined, or eliminated.

Manufacturing system/process 200 may begin with a first manufacturing operation—represented in the Figures by a tape masking station (step S1A) or a spray masking station (step S1B)—to selectively mask discrete surface areas of metallic workpieces that are being processed into copper-free electrodes. At tape masking station/step S1A of FIG. 3A, for example, a copper-free metal workpiece 202 is pushed, pulled, or otherwise placed (collectively "fed") into a tape masking device 204. According to the illustrated example, the metal workpiece 202 is a strip of aluminum sheet metal drawn from a roll 206 of aluminum sheet metal. This sheet metal roll 206 is buttressed on and rotatable about a workpiece feed roller 208 upstream from the tape masking device 204. Alternative implementations may employ metallic blanks, ingots, bars, or other appropriate starting metal workpieces. By way of example, the metal workpiece 202 may be a substantially planar foil formed from an electrically conductive metallic material, such as aluminum, magnesium, zinc, tin, or indium, including any alloys thereof or any combinations thereof. As yet a further option, the workpiece 202 may include a lithium alloy-based material, such as a lithium-aluminum alloy, a lithium-magnesium alloy, a lithium-zinc alloy, a lithium-tin alloy, or any combination thereof. For at least some preferred implementations, the metallic workpiece 202 may consist essentially of an LiAl-alloy foil with a thickness of several microns to about a millimeter (mm) or less.

Continuing with the discussion of the optional first station/step S1A of FIG. 3A, the strip of aluminum sheet metal (i.e., workpiece 202) is drawn from the sheet metal roll 206, off of the feed roller 208, and transferred through a pair of (first and second) pinch-type tape feed rollers 210A and 210B of the tape masking device 204. In addition to providing the requisite pulling forces for drawing the workpiece 202 into the tape masking device 204, these opposing feed rollers 210A, 210B also function to apply a series of dielectric masks onto discrete surface areas of the metal workpiece 202. As shown, a pair of (first and second) supply spools 212A and 212B each supports thereon a respective (first and second) roll 214A and 214B of dielectric tape. In this instance, the tape feed rollers 210A, 210B are driven, e.g., via an electric feeder motor 218, to draw (first and second) feeds of dielectric tape 216A and 216B from their respective tape rolls 214A, 214B. The top (first) tape feed roller 210A presses its top (first) tape feed 216A onto discrete areas of a top (first) surface of the metal workpiece 202, whereas the bottom (second) tape feed roller 210B presses its bottom (second) tape feed 216B onto discrete areas of a bottom (second) surface of the metal workpiece 202. An optional cutting device 220 shears the feeds of dielectric tape 216A, 216B into individual strips of tape. The tape rolls 214A, 214B may comprise any suitable dielectric tape, such as an electrically insulating polyimide film tape with silicone adhesive (e.g., KAPTON® tape), an electrically insulating polytetrafluoroethylene (PTFE) tape (e.g., TEFLON® tape), etc.

It should be appreciated that different techniques for temporarily masking the surfaces of metal workpieces may be used without departing from the intended scope of this disclosure. In addition to tape-based masking, for example, the manufacturing system/process 200 may employ, brushing, waxing, printing, and/or spray-masking techniques. As per the latter, manufacturing system/process 200 may begin at spray masking station/step S1B whereat a copper-free metal workpiece 202 is fed from a workpiece supply station 203 into a spray masking device 222. Although differing in layout, it is envisioned that any of the features and options set forth above with reference to the tape masking station S1A of FIG. 3A can be incorporated, singly or in any combination, into the spray masking station S1B, and vice versa. Similar to the tape masking station S1A, for example, the spray masking station S1B may draw a strip of aluminum sheet metal from a roll 206 of aluminum sheet metal, which is buttressed on a workpiece feed roller 208. Prior to masking, the metal workpiece 202 may undergo one or more preprocessing steps, such as surface cleaning, surface roughing, surface stripping and descaling, etc.

An inlet-side (first) pair of opposing feed rollers 224A draws the strip of aluminum sheet metal (i.e., workpiece 202) from the sheet metal roll 206 and, once drawn, feeds the workpiece into the spray masking device 222. Upon completion of the spray masking process, an outlet-side (second) pair of opposing feed rollers 224B pulls the masked strip of aluminum sheet metal out of the spray masking device 222. While both the tape masking station S1A and spray masking station S1B are shown employing rollers for handling the movement of the aluminum sheet metal, it should be appreciated that alternative material handling techniques may be utilized, including conveyor systems, robotic cells, manual transfer, including any combination thereof and the like.

As the copper-free metal workpiece 202 passes through the spray masking device 222, a pair of (first and second) opposing spray nozzles 226A and 226B apply individual strips of epoxy resin onto each side of the workpiece 202. In accord with the illustrated example, the top (first) spray nozzle 226A extracts epoxy resin 228 from inside an epoxy supply container 330 and, from the extracted volume, sprays epoxy resin 228 onto discrete areas of a top (first) surface of the workpiece 202. Likewise, the bottom (second) spray nozzle 226B extracts epoxy resin 228 from the shared epoxy supply container 330 (or a distinct supply container); from this extracted volume, nozzle 226B sprays epoxy resin 228 onto discrete areas of a bottom (second) surface of the workpiece 202. Examples of suitable epoxy resins for masking the workpiece 202 include, but are certainly not limited to, polyimides, aliphatic amines, aromatic amines, etc. For ultraviolet (UV) curing epoxies, a UV lamp 231 may be positioned immediately downstream from the spray masking device 222.

With continuing reference to FIG. 3A, the manufacturing system/process 200 advances from the first manufacturing operation/step S1A or S1B to a second manufacturing operation/step S2 and withdraws the masked metal workpiece 202M from the masking device 204, 222. After being withdrawn, the masked metal workpiece 202M includes a sequence of longitudinally spaced dielectric masks 232, with each dielectric mask 232 covering a discrete surface area of the metal workpiece 202. As shown, each mask 232 has a generally rectangular shape that extends at least the entire side-to-side width of the workpiece 202. These transversely oriented masks 232 are mutually parallel and angled substantially perpendicular to the direction of travel of the workpiece 202.

A top-side (first) series 234A of dielectric masks 232 are located on a top (first) surface of the workpiece 202, whereas a bottom-side (second) series 234B of dielectric masks 232 are located on a bottom (second) surface of the workpiece 202. These masked areas, i.e., those covered with a dielectric mask 232, are interleaved with the unmasked areas of the workpiece 202, i.e., the uncovered surface sections of the workpiece 202. Each dielectric mask 232 of the top-side series 234A may be longitudinally aligned with a respective dielectric mask 232 of the bottom-side series 234B. Depending on the type of masking technique employed, each dielectric mask 232 may include or, optionally, consist essentially of a respective strip of dielectric tape. As a further option, each dielectric 232 may include or, optionally, consist essentially of a respective strip of epoxy resin. Depending, for example, on the dimensions of the tap size and seal width, each dielectric mask 232 may have a longitudinal (side-to-side) width of about 5 mm to about 20 mm, a lateral (fore-aft) length of about 5 mm to about 100 mm, and a normal (vertical) thickness of about 50 nm or less.

After masking the workpiece 202, the masked metal workpiece 202M is selectively anodized to form distinct anodized surface sections on the unmasked areas of the workpiece 202; the masked areas of the workpiece 202 prevent anodizing of the workpiece surface areas underneath the masks 232. A third manufacturing operation/step S3 may include transferring the masked metal workpiece 202M into a chemical bath 236 of an anodizing solution 238 to form an anodized metal workpiece 202A. There are many anodization practices and solutions available but, in general, the workpiece 202 may be immersed in an aqueous electrolyte solution containing an acid, such as sulfuric acid and/or oxalic acid, at a temperature of about 25° C. In at least some preferred implementations, the anodizing solution 238 causes a porous layer of anodized aluminum oxide to form on the unmasked areas of the masked aluminum workpiece 202M. It may be desirable that the resultant anodized coating is substantially uniform in thickness and content in addition to covering the entire workpiece 202 except those sections protected with a dielectric mask.

Proceeding from the third manufacturing operation/step S3 depicted on FIG. 3A to a fourth manufacturing operation/step S4 depicted on FIG. 3B, as indicated by the circled "A" flowchart connectors, the selectively anodized metal workpiece 202A is removed from the chemical bath 236. At this juncture, the workpiece 202 may be heat treated to facilitate drying and anodization, and thereafter inspected for surface defects, homogeneity in the anodized coating, loose or missing masks, etc. The resultant anodized metal workpiece 202A includes a top-side (first) sequence 242A of longitudinally spaced anodized surface sections 240 located on a top (first) surface of the workpiece 202. Likewise, a bottom-side (second) sequence 242B of longitudinally spaced anodized surface sections 240 are located on a bottom (second) surface of the workpiece 202. The anodized coating may have a thickness of about 10 to about 30 micrometers.

Fifth manufacturing operation/step S5 of FIG. 3B includes a mask removal station 244 for removing the dielectric masks 232 from the anodized metal workpiece 202A to unmask or otherwise expose the un-anodized surface sections of the copper-free workpiece 202. The mask removal station 244 is shown with a solution shower 246 that rinses the anodized metal workpiece 202A in an organic solution 246; the solution 246 dissolves or peels off the strips of dielectric tape or cured epoxy. The organic solution 246 may comprise acetone, methanol, isopropyl alcohol, or other commercially available fluids that dissolve or otherwise remove the dielectric masks 232. Alternative techniques may be used to remove the dielectric masks 232 from the anodized metal workpiece 202A, including peeling, grinding, sanding, etc., the strips of dielectric tape/epoxy off of the anodized metal workpiece 202.

Manufacturing system/process 200 advances from the fifth manufacturing operation/step S5 to a sixth manufacturing operation/step S6 whereat the anodized metal workpiece 202A is removed from the mask removal station 244. FIG. 3B illustrates the resultant workpiece 202 with the anodized surface sections 240 interleaved with un-anodized surface sections 250, which are transversely oriented and longitudinally spaced from one another along the length of the workpiece 202. Each of the un-anodized surface sections 250 may be inspected to ensure the surface was not accidentally damaged or unintentionally anodized.

At a seventh manufacturing operation/step S7, a series of mutually parallel sealing strips 252 are applied onto the anodized metal workpiece 202A. Each sealing strip 252 is transversely oriented with respect to the workpiece 202 and longitudinally spaced from adjacent strips 252 along the length of the workpiece 202. Additionally, the sealing strips 252 are interleaved with both the anodized surface sections 240 and the un-anodized surface sections 250. These sealing strips 252 are designed to fluidly seal to a housing section of an electrochemical device (e.g., to a wall of Li-ion soft polymer pouch cell). The anodized metal workpiece 202A is thereafter cut, stamped, milled, etc. (collectively "segment"), e.g., along cut line 215, into multiple copper-free electrodes.

After segmenting the anodized metal workpiece 202A into individual electrodes, such as copper-free, anodized electrode tabs 254, the tabs 254 are assembled into individual cell pouches 256. The cell pouches 256 are then stacked into a corresponding battery module 258, and complementary tabs 254 are welded at their un-anodized surface sections to a neighboring cell tab 254. For comparable battery cell designs that employ both copper and aluminum tabs, the welding operation oftentimes necessitates that a different welding technique be implemented to weld the copper tabs than the welding technique implemented to weld the aluminum tabs. Since copper has a higher melting temperature than that of aluminum, for example, the copper tabs are laser welded to a busbar at about 5000 W to about 5500 W to achieve a melting temperature of approximately 1100+° C., whereas the aluminum tabs are laser welded to the busbar at about 2500 W to about 3500 W to achieve a melting temperature of approximately 600+° C.

By eliminating copper tabs from the battery cells 256, the battery module 258 may altogether eliminate the bus bar, as seen in manufacturing operation/steps S8A and S8B, or may utilize an optional copper-free (aluminum) bus bar 260. In a first option for the eighth manufacturing operation/step S8A, the individual tabs 254 project vertically from the distal ends of their respective battery cells 256; the tabs 254 are crimped and welded directly to one another. Comparatively, the anodized electrode tabs 254 of optional manufacturing operation/step S8B are bent into an L-shaped geometry, stacked, and then welded directly to one another. In a third option for the eighth manufacturing operation/step S8C, the electrode tabs 254 take on a "3P" parallel architecture and are welded to a shared busbar 260. This design allows the module 258 to be scaled out for larger combinations of parallel "P" connections.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, solid-state memory, a hard drive, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of manufacturing copper-free electrodes for electrochemical devices, the method comprising:
   feeding a copper-free metal workpiece into a masking device;
   applying a series of dielectric masks onto discrete surface areas of the copper-free metal workpiece via the masking device to form a masked metal workpiece with masked and unmasked areas, the series of dielectric masks including multiple mutually parallel dielectric masks spaced from one another and each covering a respective one of the discrete surface areas;
   feeding the masked metal workpiece into an anodizing solution to form an anodized metal workpiece with anodized surface sections on the unmasked areas and un-anodized surface sections underneath the dielectric masks of the masked areas;
   removing the dielectric masks to reveal the un-anodized surface sections; and
   segmenting the anodized metal workpiece into the copper-free electrodes each being substantially or entirely absent of copper and copper compounds.

2. The method of claim 1, wherein the masking device includes a supply spool bearing a roll of dielectric tape, and wherein each dielectric mask in the series of dielectric masks includes a respective strip of dielectric tape from the roll of dielectric tape.

3. The method of claim 2, wherein the masking device further includes a tape feed roller, and wherein applying the dielectric masks onto the copper-free metal workpiece includes the tape feed roller drawing a feed of dielectric tape from the roll of dielectric tape on the supply spool and pressing the feed of dielectric tape onto the discrete surface areas of the copper-free metal workpiece.

4. The method of claim 2, wherein removing the dielectric masks includes applying an organic solution to the anodized metal workpiece to dissolve the strips of dielectric tape or peeling the strips of dielectric tape off of the anodized metal workpiece.

5. The method of claim 1, wherein the masking device includes an epoxy supply container configured to store an epoxy resin and a spray nozzle operable to spray the epoxy resin, and wherein each dielectric mask in the series of dielectric masks includes a respective stripe of epoxy resin expelled from the spray nozzle.

6. The method of claim 5, wherein the masking device further includes a pair of opposing feed rollers, and wherein feeding the copper-free metal workpiece into the masking device includes the feed rollers drawing the workpiece into the masking device.

7. The method of claim 5, wherein removing the dielectric masks includes applying an organic solution to the anodized metal workpiece to dissolve the stripes of epoxy resin.

8. The method of claim 1, wherein the copper-free metal workpiece includes a lithium-aluminum (LiAl) alloy material.

9. The method of claim 1, further comprising welding each of the un-anodized surface sections of each of the copper-free electrodes to a respective copper-free current collector and/or a respective neighboring copper-free electrode.

10. The method of claim 1, wherein applying the series of dielectric masks onto the copper-free metal workpiece includes applying a first series of dielectric masks onto a first set of discrete areas of a first side of the copper-free metal workpiece, and applying a second series of dielectric masks onto a second set of discrete areas of a second side of the copper-free metal workpiece.

11. The method of claim 1, further comprising applying a series of sealing strips onto the anodized metal workpiece adjacent the un-anodized surface sections, wherein the sealing strips are configured to fluidly seal to a housing section of one of the electrochemical devices.

12. The method of claim 1, wherein the copper-free metal workpiece is formed with an aluminum-based material, and wherein the anodizing solution causes a porous layer of anodized aluminum oxide (AAO) to form on the unmasked area of the copper-free metal workpiece.

13. The method of claim 1, wherein the copper-free metal workpiece includes an aluminum sheet metal strip of a roll of sheet metal mounted on a workpiece feed roller, and wherein feeding the aluminum workpiece includes drawing the aluminum sheet metal strip from the roll of sheet metal off of the workpiece feed roller.

* * * * *